(12) United States Patent
Konetski

(10) Patent No.: US 7,434,154 B2
(45) Date of Patent: Oct. 7, 2008

(54) SYSTEMS AND METHODS FOR SYNCHRONIZING MEDIA RENDERING

(75) Inventor: David Konetski, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 674 days.

(21) Appl. No.: 11/030,822

(22) Filed: Jan. 7, 2005

(65) Prior Publication Data
US 2006/0156375 A1    Jul. 13, 2006

(51) Int. Cl.
*G06F 17/00* (2006.01)
(52) U.S. Cl. .................................................. 715/203
(58) Field of Classification Search .............. 715/500.1, 715/716, 201, 203
See application file for complete search history.

(56) References Cited

U.S. PATENT DOCUMENTS

| | | | | |
|---|---|---|---|---|
| 5,815,145 | A * | 9/1998 | Matthews, III | 725/41 |
| 6,359,656 | B1 * | 3/2002 | Huckins | 348/512 |
| 7,313,755 | B2 * | 12/2007 | Rahman et al. | 715/203 |
| 2002/0065926 | A1 * | 5/2002 | Hackney et al. | 709/231 |
| 2002/0080783 | A1 * | 6/2002 | Fujimori | 370/384 |
| 2002/0120939 | A1 * | 8/2002 | Wall et al. | 725/87 |
| 2002/0122427 | A1 * | 9/2002 | Kamentsky et al. | 370/395.4 |
| 2003/0236904 | A1 * | 12/2003 | Walpole et al. | 709/231 |
| 2004/0004631 | A1 * | 1/2004 | Debique et al. | 345/704 |
| 2004/0019911 | A1 * | 1/2004 | Gates et al. | 725/90 |
| 2004/0068588 | A1 * | 4/2004 | Kowalski et al. | 709/248 |
| 2004/0113933 | A1 * | 6/2004 | Guler | 345/716 |
| 2004/0128701 | A1 * | 7/2004 | Kaneko et al. | 725/136 |
| 2004/0133924 | A1 * | 7/2004 | Wilkins et al. | 725/135 |
| 2004/0177317 | A1 * | 9/2004 | Bradstreet | 715/500.1 |
| 2005/0137861 | A1 * | 6/2005 | Dideriksen et al. | 704/205 |
| 2005/0188012 | A1 * | 8/2005 | Dideriksen et al. | 709/204 |
| 2005/0207453 | A1 * | 9/2005 | Panvalkar et al. | 370/509 |
| 2007/0033633 | A1 * | 2/2007 | Andrews et al. | 725/135 |
| 2007/0043847 | A1 * | 2/2007 | Carter et al. | 709/223 |
| 2007/0168398 | A1 * | 7/2007 | Miroshnichenko et al. | 707/200 |

OTHER PUBLICATIONS

Gong, Multipoint Audio and Video Control for Packet-based Multimedia Conferencing, ACM 1994, pp. 425-432.*
Moal et al., Cost-Effective Streaming Server Implementation Using Hi-Tactix, ACM 2002, pp. 382-391.*
Casner et all., First IETF Internet Audiocast, ACM SIGCOMM Jul. 1992, pp. 92-97.*
Gong, Multipoint Audio and Video Control fro Packet-based Multimedia Conferencing, ACM 1994, pp. 425-432.*
"How NTP Works", The Santa Cruz Operation, Inc., http://docsrv.sco.com/NET_tcpip/ntpC.overview.html; Release 7.1.1, Nov. 5, 1999, 1 pg.
"Configuring RAVE 81s And 88s To Sync to AES3", Advanced Systems Products, RAVE: Routing Audio Via Ethernet, 2002, 3 pgs.
Copending U.S. Appl. No. 10/915,615, filed Aug. 10, 2004, entitled "Media Device Featuring Synchronized Playback", 23 pgs.
"Audio And Music Data Transmission Protocol", Audio/Video Working Group Of The 1394 Trade Association, Version 1.0, May 1997, 23 pgs.

* cited by examiner

*Primary Examiner*—Cong-Lac Huynh
(74) *Attorney, Agent, or Firm*—O'Keefe, Egan, Peterman & Enders

(57) ABSTRACT

Systems and methods for synchronizing rendering of common content across two or more network-coupled rendering nodes by embedding a time stamp into the metadata of the content.

26 Claims, 3 Drawing Sheets

SYSTEMS AND METHODS FOR SYNCHRONIZING MEDIA RENDERING

BACKGROUND OF THE INVENTION

1. Field of the Invention

This invention relates generally to content rendering, and more particularly to content rendering across a network.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the digital home begins to unfold, one of the predominant architectures for media consumption and distribution includes an information handling system configured in the form of a media server, which is the repository for digital content (e.g. a piece of digital audio content such as a piece of content stored as MPEG Layer 3 ("MP3") files and wave format ("WAV") files), and media nodes which request the digital content be transferred from the media server over a home network and then rendered locally on the media nodes. Media servers may take the form of a personal computer ("PC"), dedicated media server device, dedicated storage device, or more traditional consumer electronics device. The media node may be a dedicated box meant to bridge this new media architecture to a more traditional consumer electronics architecture, may be embedded within a piece of consumer electronics, or may be a handheld or portable device within the network. One example of media node is a digital audio receiver ("DAR") which renders digital content and outputs it as analog signals. Using this technology and architecture, the consumer can store, organize, and retain content on one or more storage devices, and access the content in the environs in which they wish to consume the content. This allows the content management and storage to be separate from the content consumption.

A common scenario that occurs during the consumption and distribution of media over home network architectures is the request that a piece of content or collection of content be rendered simultaneously on multiple media nodes in multiple rooms within a home. Social gatherings, parties, and simply doing housework while listening to music are examples of situations where such synchronized rendering would be desirable. However, when content is rendered simultaneously on multiple media nodes, each rendering node may fetch its content independently and start playing at different times. In addition, each node has its own unique internal latency characteristics and the network infrastructure and server introduce additional unpredictable delays. This typically results in relatively large playback delays between nodes or the occurrence of other anomalies such as echoes, beating, or acoustic cancellation, thereby minimizing the enjoyment value that may be achieved using multiple rendering locations.

Existing audio and video synchronization technologies and solutions fall into several categories. One category of solutions transmits a continuous clock or periodic synchronization signal, to which a locally generated clock is synchronized or from which a local clock is generated. These systems synchronize time base of one system to time base of another system. These systems are continuous synchronization systems, designed to keep two or more systems in constant time base synchronization. Solutions in this category include, International Engineering Consortium ("IEC") IEC958, Audio Engineering Society/European Broadcast Union ("AES/EBU") Sony/Philips Differential Interface ("S/PDIF") clock recovery and synchronization, frequency shift keying ("FSK") based clock recovery and synchronization, and Video Genlock systems which use signal event synchronization (e.g. black burst, color burst, H-sync) and master clock synchronization. However, using a time base synchronization system is generally overly burdensome for the synchronization of single events between multiple nodes (e.g., multiple PC's and/or other devices) of a home network system.

Another category of synchronization solution is absolute system time synchronization, which involves the generation and synchronization of an absolute system time in hours, minutes and seconds in order to synchronize events. Using such a solution, the absolute time is transmitted to each system. Examples of these systems are Society of Motion Picture and Television Engineers ("SMPTE") Longitudinal Time-Code and SMPTE Vertical Interval Time Code which use a string of 80-bits to relay the absolute time information. These solutions are designed to keep multiple systems synchronized to an absolute system time base such that a string of events can be in time synchronization, and are not designed specifically to synchronize single events, such as a single piece of content playback.

Another category of synchronization solution is universal time synchronization, designed to set time clocks such that they are synchronized to a national or international time standard. In this way, systems can use real time to synchronize and log events. These systems often use Universal Time Code (UTC) and Network Time Protocol (NTP) based solutions to transmit time information over TCP/IP networks, and synchronize multiple systems. Both client server architectures and Multi-cast solutions are employed with NTP. This type of system is a continuous time based synchronization system, not designed specifically to synchronize single events.

Dedicated, proprietary RF one to many broadcast systems are used to deliver synchronized streams. With such a one to many system, synchronization is assured. However, this type of system cannot then support unique audio or video streams being sent to individual nodes. Delivery of unique audio streams to individual nodes is the most common type of content delivery over home networks, e.g., where different people want to listen to unique music in different parts of the house.

Audio/video ("A/V") synchronization systems also exist which embed time stamps into packetized streams for synchronized audio and video decoding and presentation, such as MPEG2 and MPEG4 DTS (Decode Time Stamp), PTS (Presentation Time Stamp) and SCR (System clock Reference) data. These embedded stamps function to provide synchronized audio and video content from a single stream for a single rendering system, and do not function to provide synchronization of two identical audio streams across two rendering systems.

SUMMARY OF THE INVENTION

Disclosed herein are systems and methods for synchronizing the rendering of common content across two or more network-coupled rendering nodes. The disclosed systems and methods may be implemented in one embodiment to synchronize the rendering of a single piece of content across two or more rendering nodes coupled through a network (e.g., TCP/IP network) in a manner that enables two or more unique rendering nodes on the network to play the same piece of content at the same time. The single piece of content may be a media file, for example, an audio file, video file or audio/video file that is delivered in any suitable manner across a network, e.g., file transfer protocol (FTP), packetized for a streaming protocol, bulk transfer, etc. Using the disclosed systems and methods, a time stamp may be tied to a single piece of content (e.g., data to be delivered in the form of standalone audio file or other type of media file) rather than to the distribution protocol (e.g., packets).

In one embodiment, two or more media nodes on an IP network may be synchronized, per individual piece of content, by embedding a time stamp (e.g., an absolute system time stamp) into the metadata of the content itself. In such an embodiment, the time stamp may be employed to communicate the "presentation" time at which the media node is to play the individual piece of content. Advantageously, the disclosed systems and methods may be implemented using standard and popular metadata structures that allow for the embedding of time stamps, or user defined data which may be used for time stamp information. For example, time stamp information may be embedded in a designated user defined field prior to content transmission to the rendering node, such as in a designated user defined field of MP3 ID3v2 metadata structure. Time stamp information may also be embedded, for example, in time stamp areas provided for creation date or audio/video synchronization purposes, such as time stamp areas of Digital Theater Systems ("DTS") and Dolby Digital AC-3 metadata structures. In such a case, these time stamp areas may be re-tasked to include time stamp information for network system audio synchronization of common content across multiple system nodes. Alternatively or additionally, the disclosed systems and methods may be implemented by defining new metadata areas in user definable areas of metadata structures. For example, both DTS and AC-3 metadata support user defined metadata areas.

The disclosed systems and methods may be implemented in one embodiment using the following methodology: Media nodes attach to a network, and synchronize their absolute time clocks to the network clock. In this regard, the network clock may be kept by a master server, provided by the router, or kept by each node in a mesh fashion. When a user requests a piece of content be rendered on several media nodes simultaneously and in synchronized fashion, the content server determines the appropriate rendering (or presentation) time, and embeds a "presentation" time stamp in the metadata of the content. The media nodes then acquire the content with the embedded timestamp, and render the content in compliance with the embedded time stamp.

In respect, disclosed herein is a method that includes: transferring a piece of content, the piece of content including a time stamp contained in metadata of the piece of content, and the time stamp being used to determine a time for rendering the piece of content.

In another respect, disclosed herein is a method of content rendering that includes: receiving a piece of content, the piece of content including a time stamp contained in metadata of the piece of content, and rendering the piece of content based on the time stamp contained in the metadata of the piece of content.

In another respect, disclosed herein is a system including an information handling system configured to transfer a piece of content, the piece of content including a time stamp contained in metadata of the piece of content, and the time stamp being used to determine a time for rendering of the piece of content.

In another respect, disclosed herein is a system including an information handling system, the information handling system being configured to: receive a piece of content, the piece of content including a time stamp contained in metadata of the piece of content; and render the piece of content at a time based on the time stamp contained in the metadata of the piece of content.

In another respect, disclosed herein is a method of distributing media across a network, including: transferring the piece of content from a media server across the network to two or more media rendering nodes, the piece of content including a time stamp in the metadata of the piece of content; receiving the piece of content at each of the media rendering nodes; and rendering the piece of content at the two or more media rendering nodes at substantially the same time based on the time stamp contained in the metadata of the piece of content.

In another respect, disclosed herein is a media distribution system, including: two or more media rendering nodes coupled to a network, each of the two or more media rendering nodes including an information handling system; a media server coupled to the network, the media server including an information handling system configured to embed a time stamp into metadata of a piece of content, and to transfer the piece of content across the network to the two or more media rendering nodes. The time stamp may be used by the two or more media rendering nodes to render the piece of content at substantially the same time.

DESCRIPTION OF ILLUSTRATIVE EMBODIMENTS

Figure 1:
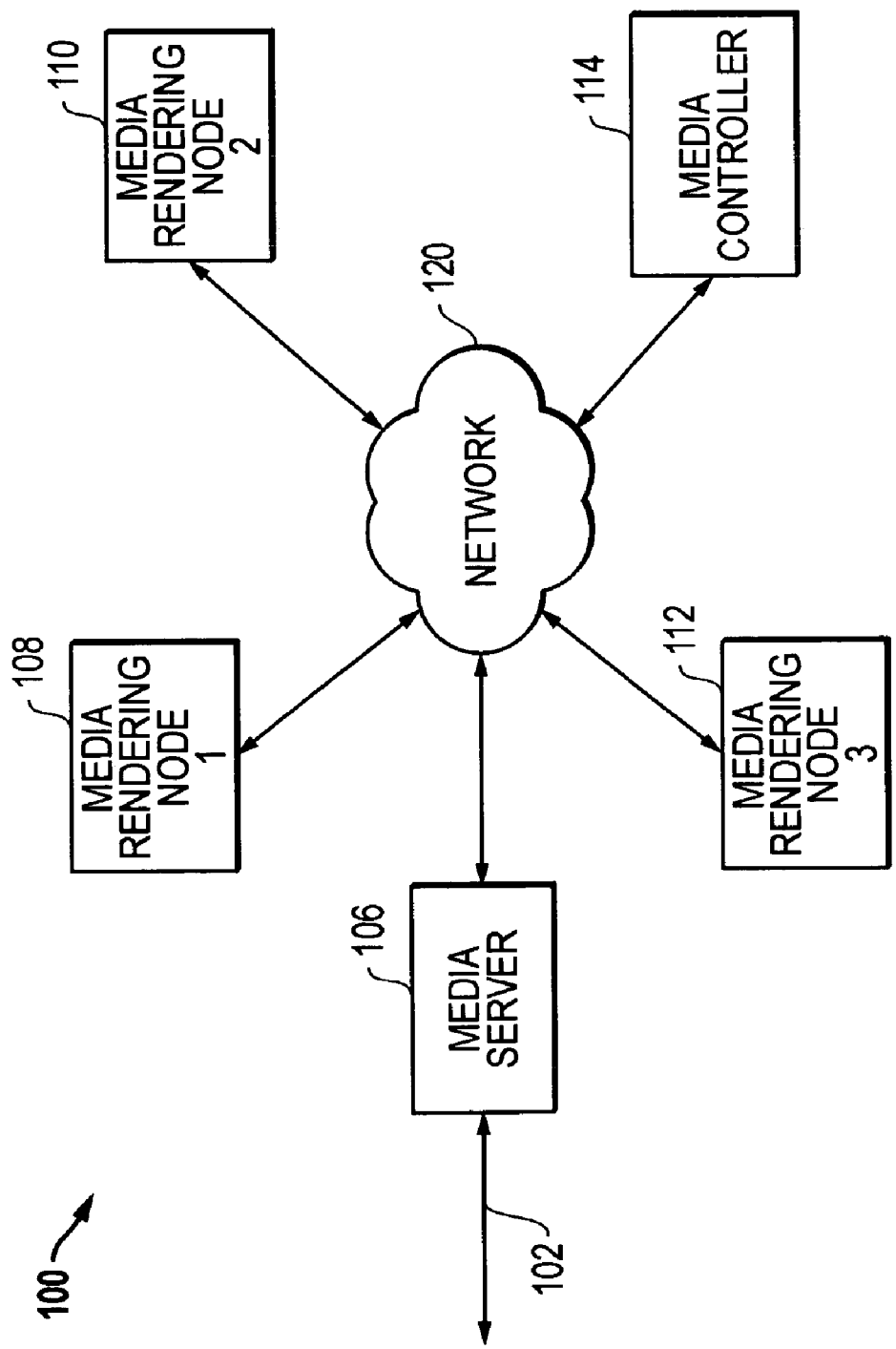
FIG. 1 is a block diagram of a network media distribution system according to one exemplary embodiment of the disclosed system and methods.

FIG. 1 is a block diagram of a network media distribution system 100 configured according to one exemplary embodiment of the disclosed system and methods. As illustrated, system 100 includes a media server 106 that is in communication with multiple network media rendering nodes 108, 110 and 112 via network 120. Although one media server and three media rendering nodes are illustrated, it will be understood that more than one media server and/or that more or less than three media rendering nodes may be present in other embodiments.

In the practice of the disclosed systems and methods, a media server such as media server 106, may be any device or combination of devices suitable for storing or otherwise handling digital content and distributing the content to one or more media rendering nodes, such as nodes 108, 110 and 112. Examples of such digital content include audio files (e.g., MP3 files, WAV files, AAC files, WMA files, etc.) and video files (e.g., MPEG files, WMV files, Real Video files, Quick Time files, etc.). Examples of media servers include, but are not limited to, personal computers, dedicated media server devices, dedicated storage devices, traditional consumer electronics devices such as televisions, DVD players, A/V receivers, etc. A media server may be an information handling system.

A media rendering node of the disclosed systems and methods, such as media rendering nodes 108, 110 and 112, may be any device or combination of devices suitable for receiving digital content from one or more media servers and for rendering this content into a form suitable for playback to a user. In this regard, a media rendering node may be a device configured to convert digital audio and/or video content into corresponding analog or digital signals suitable for reproduction for human listening and/or viewing. Such a media rendering node may be a stand-alone or dedicated device configured to provide such rendered signals to a traditional consumer electronics device (e.g., stereo, television, etc.) or other separate device (e.g., computer monitor, etc.) or may be embedded within a piece of consumer electronics. Besides stationary devices, a media rendering node may also take the form of a handheld or portable device capable of communication with the network. A media rendering node may be an information handling system such as a PC.

Network 120 may be any wireless or hardwire network medium suitable for distribution of content (e.g., audio, video, etc.) from one or more media servers to one or more media rendering nodes. Examples of network 120 include, but are not limited to, Transport Control Protocol/Internet Protocol ("TCP/IP") based networks. Specific network examples include, but are not limited to, IEEE 802.11 series wireless networks, 10/100 Base T wired networks, etc. In the exemplary embodiment of FIG. 1, network 120 is also shown configured as a local area network ("LAN") that may be communicatively coupled to an external network, such as the Internet and/or a wide area network ("WAN"), via media server 106 and network communication path 102, although communication with such an external network is not necessary. When present, network communication path 102 may be employed by media server 106 to retrieve content from one or more external sources for further distribution to one or more of media rendering nodes 108, 110, and/or 112.

FIG. 1 also shows optional media controller 114 that may be present to communicate with media server 106 and/or media rendering nodes 108, 110, 112 via network 120. Such a media controller may be any device or combination of devices suitable for controlling distribution of digital content from one or more media servers to one or more media rendering nodes in a manner as described elsewhere herein. In one exemplary embodiment, media controller 114 may be employed by a user to control distribution of content from media server 106 to one or more of media rendering nodes 108, 110, 112. For example, media controller 114 may be configured to allow a user to specify the identity of one or more pieces of content to be distributed from media server 106 to one or more specified media rendering nodes 108, 110 and/or 112 for rendering.

As will be further described herein, media controller 114 may also be employed to specify that a piece of content be played back by two or more media rendering nodes in a synchronous manner. For example, media controller 114 may be used to specify that a given audio file be transferred from media server 106 to each of media rendering nodes 108 and 112 for synchronous rendering, i.e., for rendering of this audio file by media rendering nodes 108 and 112 at substantially the same time. In one exemplary embodiment, a user may be allowed to "register" a given media rendering node as a synchronized media rendering device within distribution system 100. It will be understood that more than one media controller may be employed in a given media distribution system, and that in one embodiment one or more operations performed by controller 114 may be alternatively or additionally performed by one or more of the media server 106 and/or any one or more of media rendering nodes 108, 110 or 112.

Figure 2:
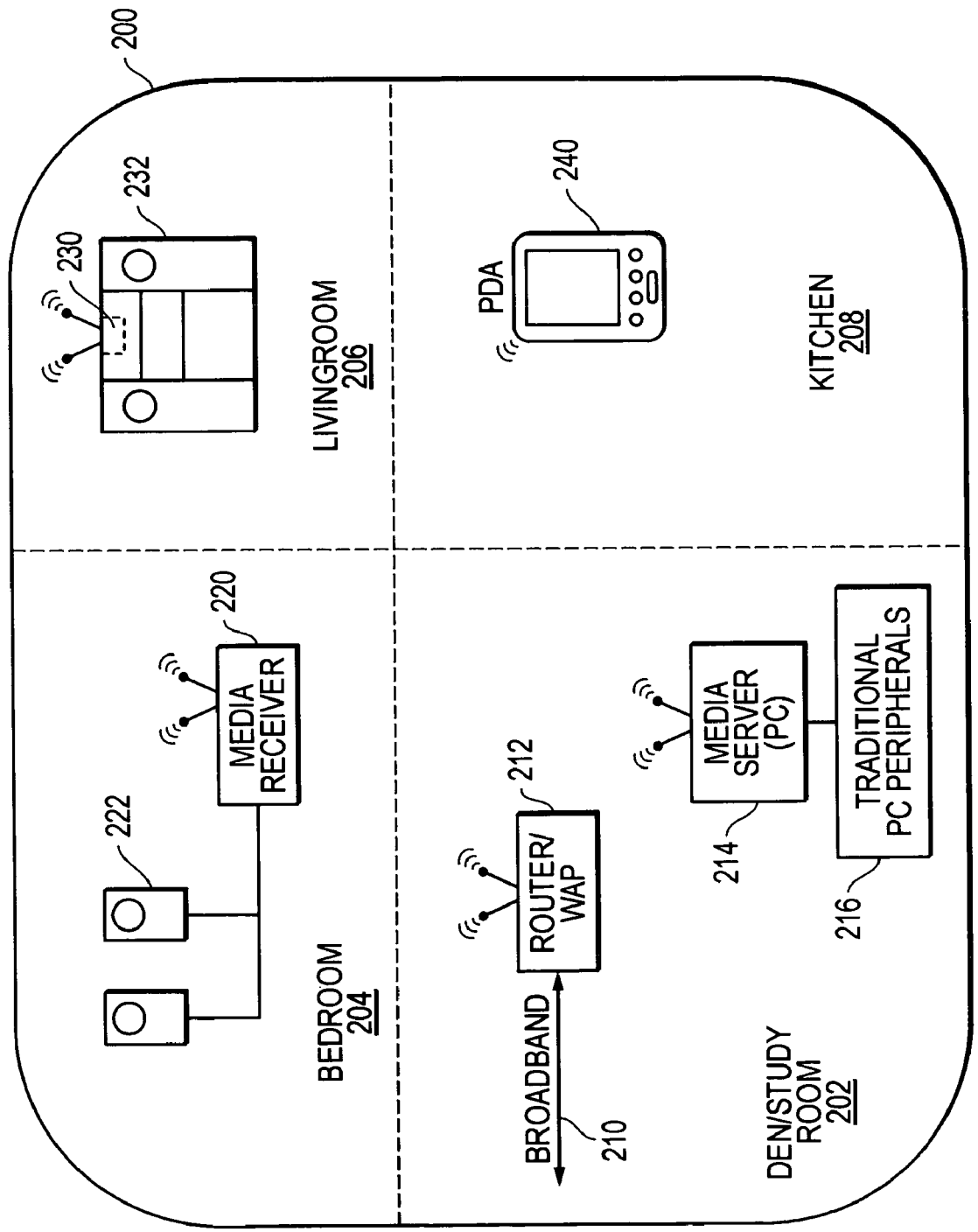
FIG. 2 is a block diagram of a home network media distribution system according to one exemplary embodiment of the disclosed system and methods.

FIG. 2 illustrates one exemplary embodiment of a network media distribution system 100 as it may be configured in the form of a home network media distribution system 200 configured for distributing audio content (e.g., music, commentary, etc.). As illustrated, system 200 includes a media server 214 that is located in a first room 202 (den/study) of a home. System 200 also includes a network media rendering node 220 located in a second room 204 (bedroom) of the home, a network media rendering node 230 located in a third room 206 (living room) of the home, and a media controller 240 in a fourth room (kitchen or other room) of the home. As shown, media server 214 is in wireless communication with media rendering nodes 220, 230 and media controller 240 through router 212/wireless access point ("WAP") 212. Router/WAP 212 is also shown coupled to the Internet via broadband network connection 210 (e.g., DSL, Cable, etc.). It will be understood that the particular configuration (number, type, etc.) of networked components illustrated in FIG. 2 is exemplary only, and that other configurations may be employed.

In the illustrated embodiment of FIG. 2, media server 214 is a primary PC that may be coupled to traditional PC peripherals (e.g., printer, scanner, camcorder, etc.). Media rendering node 220 of this embodiment is a media receiver (e.g., DAR) that is coupled to transmit analog signals to separate speakers 220. Media rendering node 230 is provided in this embodiment as an embedded component of integrated audio device 232 (e.g., boom box, alarm clock, etc.) that may be a portable or stationary device. Media controller 240 of this embodiment is a personal data assistant ("PDA") that is portable and may be carried from room to room by a user.

In a manner as previously described, a user may select two or more media rendering nodes of a media distribution system for synchronized rendering of a common piece of media content. For example, in the embodiment of FIG. 2, media controller 240 may be used by a user to specify that a given audio file be transferred from media server 214 to each of media rendering nodes 220 and 232 for synchronous rendering. It has been discovered that a human user is capable of audibly detecting a delay between two playback sources for a common piece of audio media content if the playback from the two sources differs by 20 milliseconds or more. In one embodiment of the disclosed systems and methods, each of the media rendering nodes selected for synchronous rendering may be capable of rendering of a piece of media content at a time that is within about 20 milliseconds of one another, and maintaining a separation of less than about 20 milliseconds from other selected rendering nodes throughout rendering of the piece of media content. Thus, for the embodiment of FIG. 2, a human listener moving from room 206 to room 204 will be unable to detect a delay in audio playback between media rendering node 232 and media rendering node 222.

Figure 3:
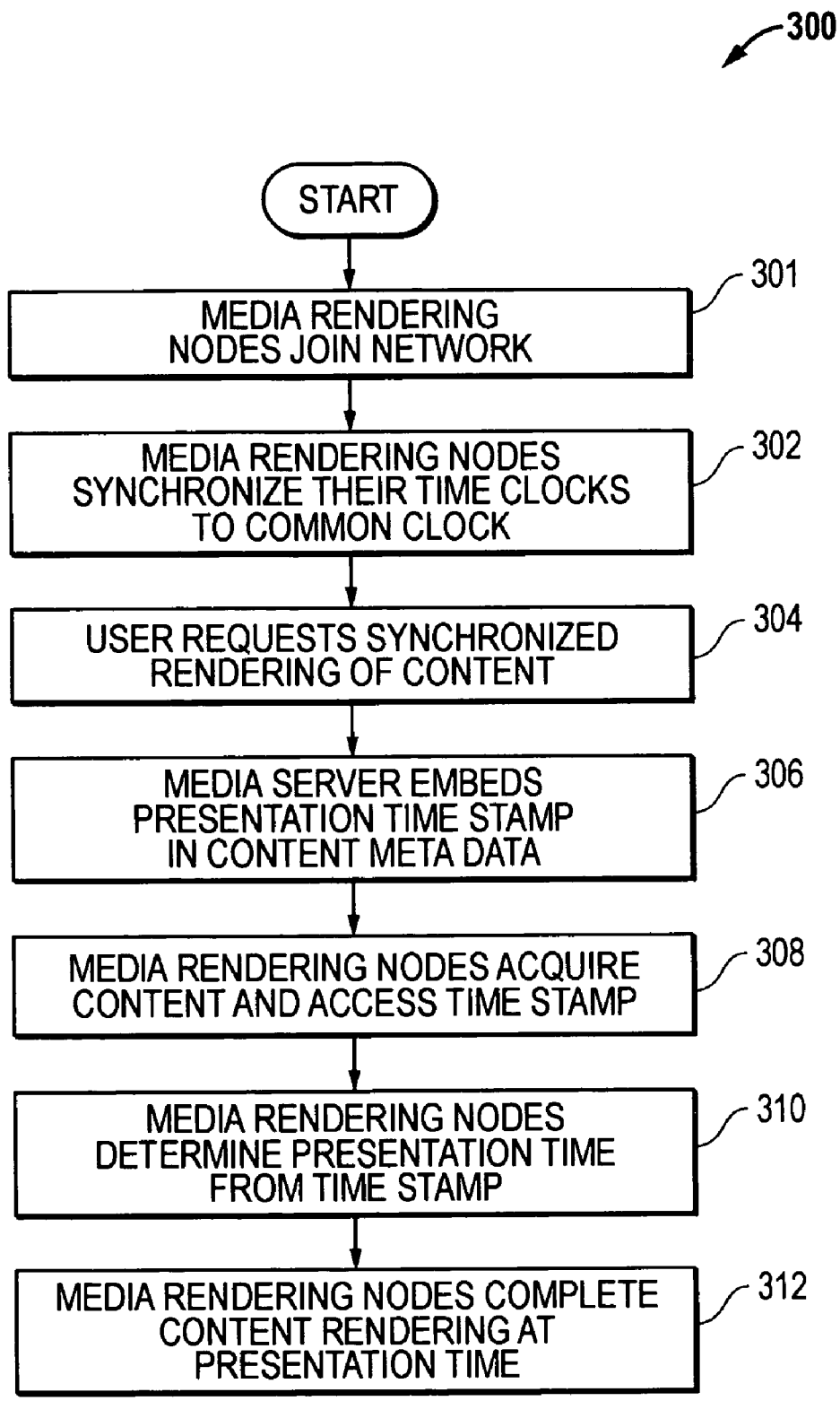
FIG. 3 is a flow chart illustrating methodology for synchronized rendering of content according to one exemplary embodiment of the disclosed system and methods.

FIG. 3 is a flow chart illustrating one exemplary embodiment of a methodology 300 that may be implemented using the disclosed systems and methods to achieve synchronized rendering of content from two or more media rendering nodes of a network based media distribution system. In step 301 of methodology 300, each of the two or more media rendering nodes joins the network. In step 302, each of the two or more media rendering nodes synchronizes its individual time clock to a common clock. This may be accomplished in any manner suitable for synchronizing the individual time clocks of the separate media rendering nodes, e.g., using a signal, broadcast pulse, etc. For example, each of the two or more media rendering nodes may synchronize its absolute time clock to a network clock. Such a network clock may be provided by a master server (e.g., media server), provided by a network router, kept by each media rendering node in mesh fashion, etc.

In one exemplary embodiment, the time clock of each of the two or more media rendering nodes may be synchronized in step 302 using TCP/IP universal time synchronization methods such as Universal Time Code (UTC), Network Time Protocol (NTP), etc. In another exemplary embodiment, a continuous clock or periodic synchronization signal may be employed to synchronize the time clocks of each of the two or more media rendering nodes. In yet another embodiment, absolute time may be transmitted to each of the two or more media rendering nodes. In some embodiments, a media server may also synchronize its individual time clock to a common clock (e.g., in the case of NTP absolute time), or to a network clock.

In step 304, a user requests synchronized rendering of at least one piece of content on the two or more media rendering nodes of step 302 by submitting the request to the media server, e.g., using a media controller to request playback of the content from the media server, directly inputting the request into the media server, etc. Such a request may be for a single piece of content or may be a playlist request for multiple pieces of content. Where a playlist of multiple content pieces is requested, the media server may in one embodiment forward the playlist to the two or more rendering nodes which then may pull each piece of content sequentially from the media server for rendering as will be described further herein. At step 304, a user may also have the option of designating which two or more media rendering nodes are to be used for synchronized rendering of the requested content. Thus, only a portion of the available media rendering nodes may be selected for synchronized rendering. In one embodiment, a user may submit a request to a media rendering node for synchronized rendering of content on two or more media rendering nodes, and the media rendering node may then transfer the request to the media server (which may include the individual media rendering nodes selected for playback).

Although not illustrated, it is also possible that synchronized rendering may be initiated automatically, for example, as a scheduled event of the media server or based on a scheduled automatic request received from a media controller, media rendering node, other network coupled device, etc. As previously described, it is possible that only a portion of the media rendering nodes of a media distribution system may be selected for synchronized rendering, so that the two or more media rendering nodes of steps 302 and 304 may represent only a portion of all media rendering nodes of the system.

When the media server receives the request for synchronized rendering of a particular piece of content (e.g., audio file), it embeds a presentation time stamp in the metadata associated with the piece of content in step 306 and the file is transferred to each of the two or more media rendering nodes of step 304. Where rendering of two or more pieces of content (e.g., two or more audio files) are requested, the media server may determine sequential presentation times for each sequential piece of requested content. The embedded time stamp may be of any form suitable for representing the presentation for the particular piece of media content. The presentation time represents a time relative to the common clock of step 302 at which each of the two or more media rendering nodes is to initiate rendering of the requested piece of content.

Upon receipt of a request for content rendering, a presentation time may be determined solely by the media server using predefined rules or methodology. For example, a presentation time may be determined that is far enough in the future to allow for network latencies and latencies of the individual media rendering nodes that have been selected for synchronous rendering. Examples of such latencies include time required for the piece of content to be transferred to all of the selected media rendering nodes, and time required for each of the media rendering nodes to decode the specific piece of content. It will be understood that the total latency time from transfer of content by the media server to content rendering by a given media rendering node may vary from node to node. Thus, a media server may determine a presentation time sufficiently far enough away in the future so that all selected media rendering nodes have sufficient time to receive and decode the content, and to complete rendering at the designated presentation time. Alternatively, a presentation time may represent an additional time delay specified by the user such that rendering finishes at a specific selected time that is further away in the future. In either case, the media server then transfers the requested piece of content to each of the two or more media rendering nodes across the media distribution system network. In one embodiment, the metadata of each individual sequential piece of content contains a presentation time stamp, and is transferred from the media server to the media rendering nodes prior to completion of rendering of the preceding sequential piece by each of the individual media rendering nodes.

Where multiple pieces of content have been requested (e.g., playlist), the media server may determine a presentation time for each sequential piece of content that follows another piece of content in the same request by adding the rendering time of the preceding piece of content to the presentation time of the preceding piece of content. An optional spacer time (e.g., 1 or 2 seconds) may be added to provide a pause between rendering of sequential pieces of content and to absorb any skew that develops between individual media rendering nodes during rendering. In one embodiment, the media server may optionally forward the playlist to each of the two or more media rendering nodes, each of which then requests the sequential pieces of content from the media server in the sequential order of the playlist.

Still referring to step 306, a presentation time stamp may be embedded into any form of metadata structure that is associated with the requested piece of content. Such metadata structures include metadata structures that allow for the embedding of time stamps, or user defined data which may be used for time stamp information. Examples of types of such metadata fields include, but are not limited to, designated user defined fields, audio/video synchronization time stamp areas, etc. For example, creation date or audio/video synchronization time stamp areas may be re-tasked to include time stamp information for network system audio synchronization of a common content stream across multiple system nodes of a media distribution system. Alternatively or additionally, the disclosed systems and methods may be implemented by defining new metadata areas in user definable areas of metadata structures.

Table 1 is a listing of exemplary media formats and their corresponding metadata structures that may be utilized for the embedding of time stamps according to the disclosed systems and methods. It will be understood that the list of Table 1 is exemplary only, and that any other media format having a metadata structure suitable for embedding of time stamp information may be utilized in the practice of the disclosed systems and methods.

TABLE 1

| MEDIA FORMAT | FORMAT TYPE | METADATA STRUCTURE FOR AUDIO SYNCHRONIZATION TIME STAMP |
|---|---|---|
| MP3 | Audio File | User Defined Fields (IP3v2) |
| DTS | Audio/Video File | A/V Synchronization Time Stamp Area, Creation Date Time Stamp Area or Newly Defined Areas in User Defined Area |
| AC-3 | Audio/Video File | A/V Synchronization Time Stamp Area, Creation Date Time Stamp Area or Newly Defined Areas in User Defined Area |
| WMA | Audio File | User Defined Fields |

In step 308, each of the two or more media rendering nodes acquires the requested piece of content from the media distribution network and accesses the presentation time stamp in the metadata of the content. In step 310, each of the two or more media rendering nodes determines the presentation time relative to the common clock of step 302 for the particular piece of requested content, and in step 312 each of the two or more media rendering nodes completes rendering of the requested piece of content at the presentation time. Because each of the two or more media rendering nodes completes rendering at the same presentation time relative to the common clock of step 302, the rendering of the requested piece of content is substantially synchronized between the two or more media rendering nodes, e.g., so that a listener will be unable to detect a delay in audio playback between the two or more media rendering nodes when within simultaneous hearing range of the two or more media rendering nodes.

Using the disclosed systems and methods, a media distribution system may be implemented so that it is capable of selectably providing simultaneous and synchronized rendering of a single piece of content on multiple media rendering nodes. In this regard, a common presentation time stamp may be embedded by a media server into metadata of the requested content transferred to multiple media rendering nodes when synchronized rendering is desired. When non-synchronized rendering is desired, no presentation time stamp may be embedded into the content metadata by the media server so that start of rendering on any given media rendering nodes is solely dependant on system latency, or different presentation time stamps may be embedded into the metadata of content transferred to different media rendering nodes so that start of rendering is intentionally different by each media rendering node. Non-synchronized rendering may be desirable, for example, for rendering of unique pieces of content on different media rendering nodes or for rendering of a single piece of content at different times on different media rendering nodes.

Although particular embodiments of synchronized audio media rendering have been described herein, the disclosed systems and methods may also be implemented for synchronized rendering of a single common piece of audio/video media (e.g., movie, music video, recorded television program, etc.) on two or more media rendering nodes. In one embodiment, a presentation time stamp may be embedded into the audio/video synchronization area of the metadata of an audio/video file in a manner similar to the embedding of presentation time stamps into metadata of audio files.

Synchronized rendering of relatively longer pieces of content, such as audio/video presentations (e.g., theatrical movies) or other media files having a relatively long playing time may be more susceptible to skew development during rendering due to unique latency characteristics of individual media rendering nodes. To address this possibility, a longer media file may be split up into a number of smaller sequential files by the media server. The media server may then transfer a playlist of these sequential media files to the two or more media rendering nodes and embed a presentation time stamp into the metadata of each of the sequential media files, in a manner as described previously. Should any skew develop between nodes during rendering of an individual file of the playlist, the slower media rendering node may skip any remaining portion of the content (e.g., remaining playing time) of the preceding file of the playlist in order to complete presentation of the next sequential file at the indicated presentation time and eliminate the skew. In one exemplary embodiment, each of the media rendering nodes may be configured as a smart node that reports its rendering progress to a media server in real time manner. Using this reported rendering information, the media server may transmit a command to the faster media rendering nodes (those nodes that are ahead of the slowest media rendering node in terms of rendering of the file) that causes the faster nodes to slow and/or pause rendering as necessary in order to allow the slower media rendering node/s to catch up and eliminate any developed skew without noticeable skip in the presentation.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method comprising:
   transmitting a piece of content across a network from an information handling system configured as a media server to two or more media rendering nodes, said piece of content comprising a presentation time stamp contained in metadata of said piece of content, said presentation time stamp being embedded into said metadata of said piece of content by said media server prior to said transmission; and
   causing said two or more media rendering nodes to render said same piece of content at substantially the same time based on said presentation time stamp;
   wherein each of said two or more media rendering nodes comprises an individual time clock that is synchronized to a common clock independent of said presentation time stamp at said time that said piece of content is transferred across said network from said media server to said two or more media rendering nodes;
   wherein said presentation time stamp specifies a specific time for rendering said piece of content relative to said synchronized common clock at which each of said two or more media rendering nodes is to render said piece of content to cause said two or more media rendering nodes to render said same piece of content at substantially the same time; and
   wherein said piece of content is a media file.

2. The method of claim 1, wherein said presentation time stamp is a presentation time stamp specifying a specific common time at which each of said two or more media rendering nodes are to initiate rendering of said content.

3. The method of claim 1, wherein said presentation time stamp is a presentation time stamp specifying a specific common time at which each of said two or more media rendering nodes are to complete rendering of said content.

4. The method of claim 1, further comprising transmitting said piece of content across said network from said media server to said two or more media rendering nodes in response to a user request for said piece of content received at said media server from across said network.

5. The method of claim 1, wherein said piece of content is an audio file.

6. The method of claim 1, further comprising:
   transmitting a playlist of multiple content pieces from said media server across said network to said two or more media rendering nodes; and
   transmitting said multiple pieces of content from said media server across said network to said two or more media rendering nodes, each given one of said pieces of content comprising a respective presentation time stamp contained in metadata of said piece of content, said respective presentation time stamp specifying the specific rendering time of said given one of said pieces of content of said playlist relative to said synchronized common clock at which each of said two or more media rendering nodes is to initiate rendering said piece of content;
   wherein each of said presentation time stamps contained in said metadata of a given one of said pieces of content causes said two or more media rendering nodes to initiate or complete rendering said given one of said pieces of content at substantially the same time at each of said two or more media rendering nodes at the specific rendering time specified by said presentation time stamp.

7. A method of content rendering comprising:
   receiving a piece of content at a first information handling system across a network from a media server, said first information handling system configured as a first media rendering node, said piece of content comprising a presentation time stamp contained in metadata of said piece of content, and said presentation time stamp specifying a specific time for rendering said piece of content relative to a synchronized common clock at which each of said first media rendering node and at least one additional and second media rendering node also receiving said piece of content across said network is to render said piece of content to cause said at least first and second media rendering nodes to render said same piece of content at substantially the same time; and
   rendering said piece of content at the specific rendering time specified by said time stamp contained in said metadata of said piece of content at substantially the same time as said piece of content is rendered at said second media rendering node coupled to said network;
   wherein first media rendering node comprises an individual time clock that is synchronized to a common clock with said media server and said second media rendering node independent of said presentation time stamp at said time that said piece of content is transferred across said network from said media server to said first media rendering node; and
   wherein said piece of content is a media file.

8. The method of claim 7, wherein said time stamp is a presentation time stamp specifying a specific common time at which said first media rendering node is to complete rendering of said content.

9. The method of claim 8, wherein said first media rendering node comprises a time clock, and wherein said method further comprises synchronizing said time clock of said first media rendering node with a time clock of said at least one second media rendering node coupled to said network prior to rendering said piece of content at said first media rendering node.

10. The method of claim 9, wherein said piece of content is an audio file; and wherein said method further comprises completing said rendering of said piece of content at said first media rendering node at a time that is within about 20 milliseconds of the time of completing said rendering of said piece of content at said at least one second media rendering node coupled to said network.

11. The method of claim 7, further comprising:
   receiving a playlist of multiple content pieces in said first media rendering node across said network from said media server; and
   receiving said multiple pieces of content in said first media rendering node, each given one of said pieces of content comprising a respective presentation time stamp contained in metadata of said piece of content, said respective time stamp specifying the specific rendering time of said given one of said pieces of content of said playlist relative to said synchronized common clock at which each of said first and second media rendering nodes is to initiate rendering said piece of content;
   rendering each given one of said pieces of content at said first media rendering node, said given one of said pieces of content being caused to be rendered at said first media rendering node at substantially the same time as at said second media rendering node at the specific rendering time specified by said presentation time stamp contained in said metadata of said given one of said pieces of content.

12. The method of claim 7, wherein said presentation time stamp is a presentation time stamp specifying a specific common time at which said first media rendering node is to initiate rendering of said content.

13. A system comprising an information handling system configured as a media server to transmit a piece of content across a network to two or more media rendering nodes, said piece of content being a media file that comprises a presentation time stamp contained in metadata of said piece of content, said presentation time stamp being embedded into said metadata of said piece of content by said media server prior to said transmission, and said presentation time stamp being used to determine a time for rendering of said piece of content by causing said two or more media rendering nodes to render said same piece of content at substantially the same time based on said presentation time stamp; wherein said presentation time stamp specifies the specific time for rendering said piece of content relative to said synchronized common clock at which each of said two or more media rendering nodes is to render said piece of content to cause said two or more media rendering nodes to render said same piece of content at substantially the same time; and wherein said common clock is synchronized independent of said presentation time stamp.

14. The system of claim 13, wherein said information handling system is further configured to transmit said piece of content across said network to said two or more media rendering nodes in response to a user request for said piece of content received at said information handling system from across said network.

15. The system of claim 13, wherein said piece of content is an audio file.

16. The system of claim 13, wherein said information handling system is further configured to:
    transmit a playlist of multiple content pieces across said network to said two or more media rendering nodes; and
    transmit said multiple pieces of content across said network to said two or more media rendering nodes, each given one of said pieces of content comprising a respective presentation time stamp contained in metadata of said piece of content, said respective time stamp specifying the specific rendering time of said given one of said pieces of content of said playlist relative to said synchronized common clock at which each of said two or more media rendering nodes is to initiate rendering said piece of content;
    wherein each of said presentation time stamps contained in said metadata of a given one of said pieces of content causes said two or more media rendering nodes to render a given one of said pieces of content at substantially the same time at each of said two or more media rendering nodes at the specific rendering time specified by said presentation time.

17. A system comprising a first information handling system, said first information handling system configured as a first media rendering node and being configured to:
    receive a piece of content across a network from a media server, said piece of content comprising a presentation time stamp contained in metadata of said piece of content, said presentation time stamp specifying the specific time for rendering said piece of content relative to a synchronized common clock at which each of said first media rendering node and at least one additional and second media rendering node also receiving said piece of content across said network is to render said piece of content to cause said at least first and second media rendering nodes to render said same piece of content at substantially the same time; and
    render said piece of content at a time at the specific rendering time specified by said time stamp contained in said metadata of said piece of content at substantially the same time as said piece of content is rendered at said second media rendering node coupled to said network;
    wherein first media rendering node comprises an individual time clock that is synchronized to a common clock with said media server and said second media rendering node independent of said presentation time stamp at said time that said piece of content is transferred across said network from said media server to said first media rendering node;
    wherein said piece of content is a media file.

18. The system of claim 17, wherein said presentation time stamp is a presentation time stamp specifying a specific time at which said first information handling system is to complete rendering of said content; and wherein said first information handling system is further configured to complete rendering of said piece of content at said time specified by said presentation time stamp.

19. The system of claim 18, wherein said first information handling system further comprises a time clock; and wherein said first information handling system is further configured to synchronize said time clock with a second information handling system of said at least one additional second media rendering node coupled to said network prior to rendering said piece of content.

20. The system of claim 17, wherein said first information handling system is further configured to:
    receive a playlist of multiple content pieces across said network from said media server; and
    receive said multiple pieces of content, each given one of said pieces of content comprising a respective time stamp contained in metadata of said piece of content, said respective time stamp specifying the specific rendering time of said given one of said pieces of content of said playlist relative to said synchronized common clock at which each of said first and second media rendering nodes is to initiate rendering said piece of content;
    render each given one of said pieces of content at the specific rendering time specified by said presentation time stamp contained in said metadata of said given one of said pieces of content, said given one of said pieces of content being caused to be rendered at said first media rendering node at substantially the same time as at said second media rendering node at the specific rendering time specified by said presentation time stamp contained in said metadata of said given one of said pieces of content.

21. The system of claim 17, wherein said piece of content is an audio file.

22. The system of claim 17, wherein said presentation time stamp is a presentation time stamp specifying a specific time at which said first information handling system is to initiate rendering of said content; and wherein said first information handling system is further configured to initiate rendering of said piece of content at said time specified by said presentation time stamp.

23. A method of distributing media across a network, comprising:
    transmitting said piece of content from an information handling system configured as a media server across said network to two or more information handling systems configured as media rendering nodes, said piece of content comprising a presentation time stamp in said metadata of said piece of content, said presentation time stamp being embedded into said metadata of said piece of content by said media server prior to said transmission;

receiving said piece of content at each of said media rendering nodes; and causing said two or more media rendering nodes to render said same piece of content at substantially the same time based on said presentation time stamp contained in said metadata of said piece of content;

wherein each of said two or more media rendering nodes comprises an individual time clock that is synchronized to a common clock independent of said presentation time stamp at said time that said piece of content is transferred across said network from said media server to said two or more media rendering nodes;

wherein said presentation time stamp specifies the specific time for rendering said piece of content relative to said synchronized common clock at which each of said two or more media rendering nodes is to render said piece of content to cause said two or more media rendering nodes to render said same piece of content at substantially the same time;

wherein said piece of content is a media file.

24. The method of claim 23, wherein said piece of content is an audio file; and wherein said method further comprises completing said rendering of said piece of content at a first one of said two or more media rendering nodes at a time that is within about 20 milliseconds of the time of completing said rendering of said piece of content at a second one of said two or more media rendering nodes.

25. A media distribution system, comprising:

two or more media rendering nodes coupled to a network, each of said two or more media rendering nodes comprising an information handling system; and a media server coupled to said network, said media server comprising an information handling system configured to embed a presentation time stamp into metadata of a piece of content, and to transmit said piece of content across said network to said two or more media rendering nodes, said presentation time stamp being embedded into said metadata of said piece of content by said media server prior to said transmission;

wherein said time stamp is used by said two or more media rendering nodes to render said same piece of content at substantially the same time;

wherein each of said two or more media rendering nodes comprises an individual time clock that is synchronized to a common clock independent of said presentation time stamp at said time that said piece of content is transferred across said network from said media server to said two or more media rendering nodes;

wherein said presentation time stamp specifies the specific time for rendering said piece of content relative to said synchronized common clock at which each of said two or more media rendering nodes is to render said piece of content to cause said two or more media rendering nodes to render said same piece of content at substantially the same time; and wherein said piece of content is a media file.

26. The system of claim 25, wherein said piece of content is an audio file.

* * * * *